United States Patent [19]

Une

[11] Patent Number: 5,053,792

[45] Date of Patent: Oct. 1, 1991

[54] DEVICE FOR COOLING THERMAL HEAD

[75] Inventor: Ryuzo Une, Hiroshima, Japan

[73] Assignee: Mitsubishi Denki K.K., Tokyo, Japan

[21] Appl. No.: 551,356

[22] Filed: Jul. 12, 1990

[30] Foreign Application Priority Data

Aug. 3, 1989 [JP] Japan ................................. 1-203225

[51] Int. Cl.[5] ........................ G01D 9/00; G01D 15/10; B41J 29/377

[52] U.S. Cl. ................................ 346/146; 346/76 PH; 400/719

[58] Field of Search ............ 400/719; 346/146, 76 PH

[56] References Cited

FOREIGN PATENT DOCUMENTS 60-49986 3/1985 Japan .
0240485 11/1985 Japan .................................. 400/719
0253467 11/1987 Japan .
63-37243 3/1988 Japan .
63-309485 12/1988 Japan .
0115668 5/1989 Japan .

*Primary Examiner*—Benjamin R. Fuller
*Assistant Examiner*—Huan Tran
*Attorney, Agent, or Firm*—Sughrue, Mion, Zinn, Macpeak & Seas

[57] ABSTRACT

A device for cooling a thermal head of a thermal image recording apparatus comprising a ventilation unit for producing a stream of air for cooling the thermal head and a duct for guiding the stream of air having cooled the thermal head outside the recording apparatus. The air heated by having cooled the thermal head does not circulate within the recording apparatus, whereby the temperature within the recording apparatus can be prevented from rising.

6 Claims, 2 Drawing Sheets

DEVICE FOR COOLING THERMAL HEAD

BACKGROUND OF THE INVENTION

The present invention relates to cooling a thermal head of a thermal image recording apparatus, and more particularly to a structure that allows the prevention of rising temperatures within the image recording apparatus.

FIG. 3 is a perspective view showing the main portion of a conventional device for cooling a thermal head disclosed, e.g., in Japanese Patent Application (UPA) No. 147374/1985 (the term "UPA" as used herein means "Unexamined Published Application").

In the figure, reference numeral (1) designates a thermal head; (2), a radiating fin mounted on the thermal head (1); (3), a platen roller; (4), a sheet of image recording paper; (5), a blower; (6) a conduit for guiding a stream of air from the blower (5); and (7), a slot, arranged on the conduit (6), through which the stream of air exists.

The operation of the conventional device for cooling a thermal head as constructed above will be described. In a thermal image recording apparatus, a predetermined image is recorded on the image recording sheet (4) by heat generated by an electric signal applied to heating elements of the thermal head (1). The amount of picture element formation on image sheet depends on such factors as the temperature of the heating elements, i.e., the amount of electric energy applied to the heating elements and the temperature of the thermal head (1) itself. The electric energy applied to the heating elements is controlled within a prescribed range by a control circuit. The thermal head (1), on the other hand, keeps the temperature from rising by dissipating the heat accumulated through printing from the radiating fin (2). Also, the stream of air produced by the blower (5) is directed to the radiating fin (2) from the slot (7) to improve the radiating efficiency of the radiating fin (2) and to make the temperature distribution of the thermal head (1) uniform. Generally, the conventional device for cooling the thermal head is accommodated within a case that constitutes the image recording apparatus.

With the device for cooling a thermal head constructed as described above, the air blown from the blower (5) to the radiating fin (2) and thus heated by going through the radiating fin (2) circulates within the case of the image recording apparatus, thereby increasing the temperature inside the image recording apparatus as a whole. Hence, the thermal head (1) is also heated, and as a result, there is caused a problem in that the increase in temperature within the image recording apparatus reduces the life of various parts, especially, of electric components, constituting the image recording apparatus.

SUMMARY OF THE INVENTION

The present invention has been made in consideration of the above problem and has as an object the provision of a device for cooling a thermal head not causing the internal temperature of a thermal image recording apparatus to be increased by air that has cooled the thermal head.

The device for cooling a thermal head according to the present invention comprises ventilation means for directing a stream of air to a radiating fin mounted on the thermal head and a duct means for guiding the stream of air having cooled the radiating fin to the outside of the image recording apparatus.

The device for cooling a thermal head according to the present invention is operated so that the duct guides the air heated by radiating fin to the outside of the image recording apparatus.

DETAILED DESCRIPTION OF THE PREFERRED EMBODIMENT

Figure 1:
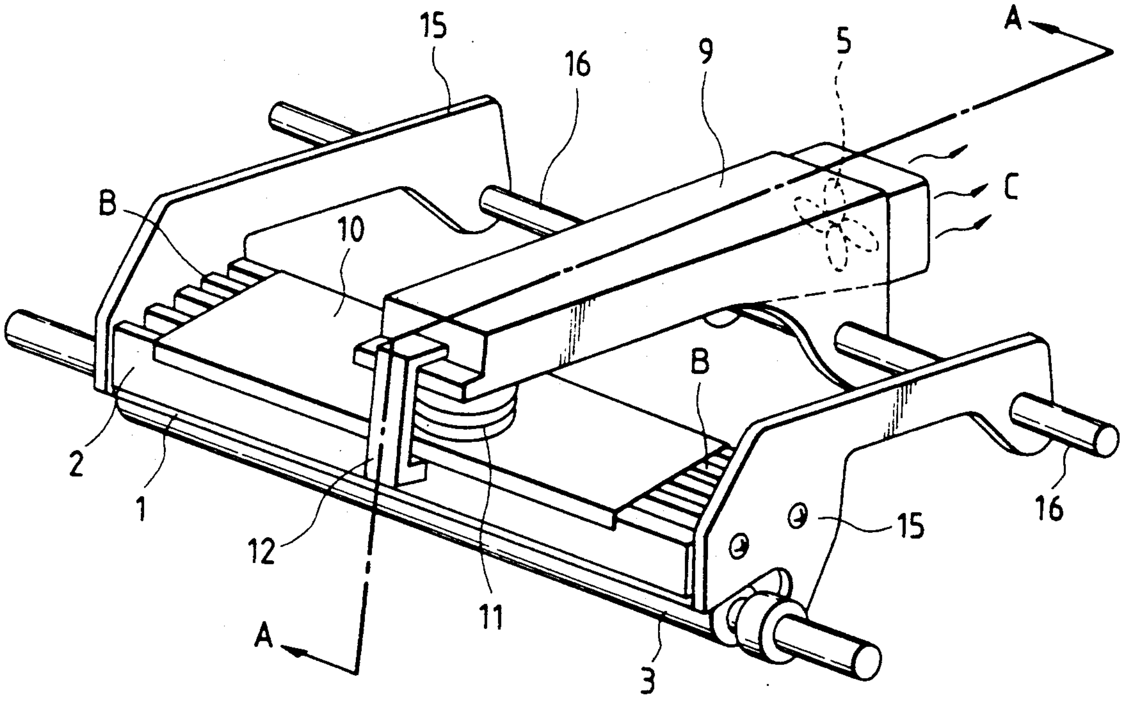
FIG. 1 is a perspective view showing the main portion of an embodiment of the present invention.
Figure 2:
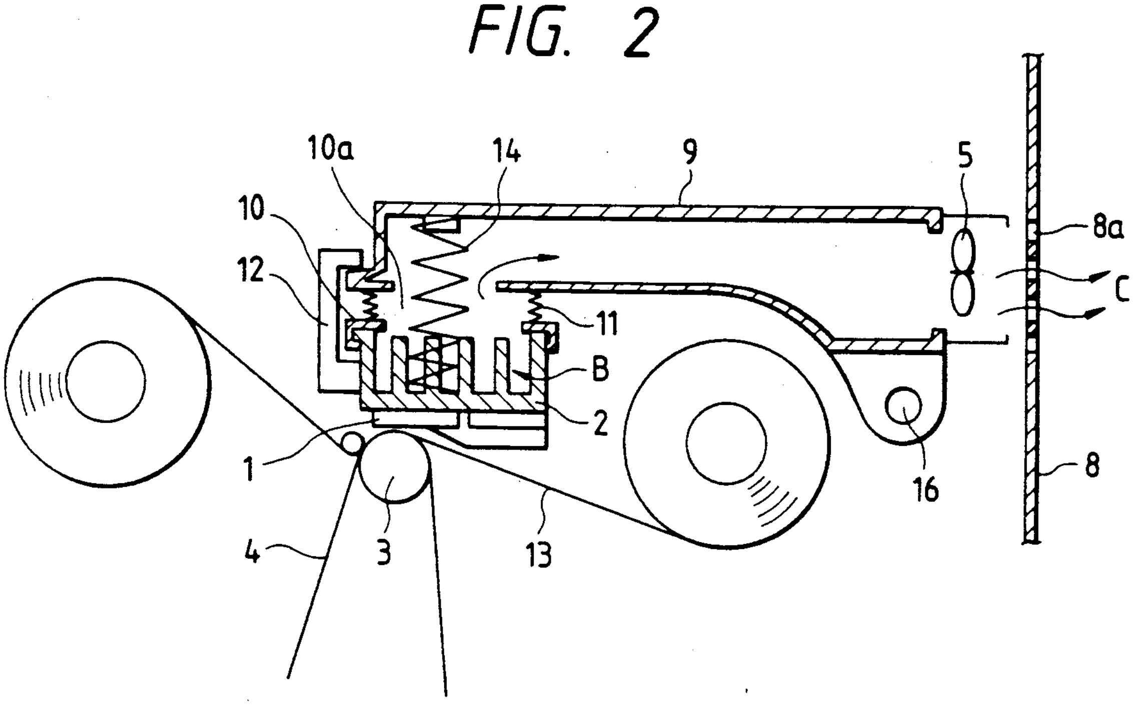
FIG. 2 is a sectional view taken along line A—A of FIG. 1.
Figure 3:
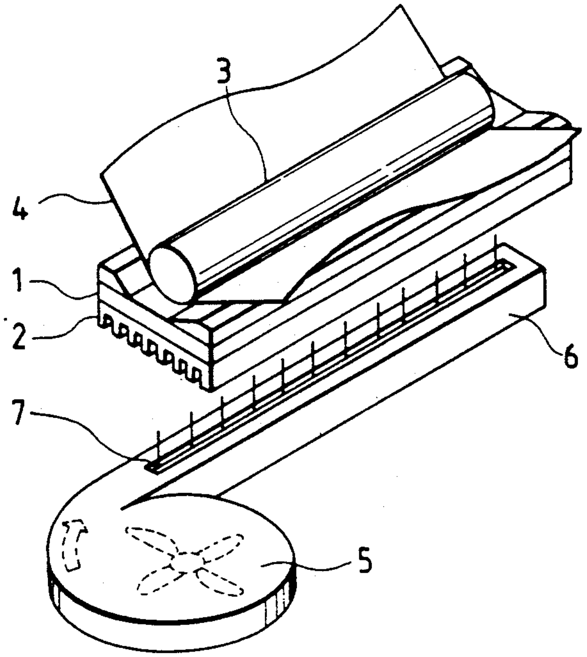
FIG. 3 PRIOR ART
FIG. 3 is a perspective view showing the main portion of a conventional device for cooling a thermal head.

FIG. 1 is a perspective view showing the main portion of an embodiment of the present invention, and FIG. 2 is a sectional view taken along line A—A of FIG. 1.

In the figures, reference numerals (1) through (5) designate parts and components as in the conventional example.

Reference numeral (8) designates a case of the image recording apparatus; (8*a*), a ventilating hole disposed at a predetermined position on a lateral side of the case (8); and (9), a duct, one opening of which is located confronting the ventilating hole (8*a*). The blower (5) is located near the opening and serves as ventilation means for discharging air from the inside of the duct (9) to the outside of the image recording apparatus through the ventilating hole (8*a*). The other opening of the duct (9) is arranged so as to face the radiating fin (2). Reference numeral (10) designates a cover which covers the projecting ribs of the radiating fin (2) and has an air collecting hole (10*a*) for collecting air that passes through the ribs substantially at the middle thereof; (11), an expander elastically connecting between the periphery of the air collecting hole (10*a*) and that of the other opening of the duct (9) and shielding the interior of the image recording apparatus; (12), a hook for holding the other opening of the duct (9) and the radiating fin (2) through the cover (10) and the expander (11); (13), an ink sheet for thermal transfer; (14), a compression and; (15), an arm which is pivotally supported by a shaft (16) so as to hold the thermal head (1) and the radiating fin (2). This arm can separate the thermal head (1) from the platen roller (3) using the shaft (16) as a pivot. Since the other opening of the duct (9) is also pivotally supported by the shaft (16), the duct (9) is rotated in synchronism with the thermal head (1) when the thermal head (1) is separated from the platen roller (3).

In the device thus constructed, a stream of air is generated by the blower (5) and flows from positions designated by reference character B to a location indicated by reference character C in the figures. This air stream cools the thermal head (1) via the radiating fin (2) and the air heated by the cooling of the fin (2) is discharged outside the image recording apparatus through the expander (11), duct (9), and the ventilating hole (8*a*). Thus, the air heated by cooling the thermal head (1) does not circulate within the image recording apparatus, whereby an increase in temperature within the image recording apparatus can be prevented.

As described above, the present invention can provide a device for cooling a thermal head by which air that has cooled the thermal head through the radiating fin does not increase the temperature within the image recording apparatus. A ventilation means produces a stream of air for cooling the radiating fin and a duct guides the air stream after cooling the radiating fin outside the image recording apparatus.

While there has been described a preferred embodiment of the invention, it will be obvious to those skilled in the art that various changes and modifications may be made therein without departing from the invention, and it is intended, therefore, to cover in the appended claims all such changes and modifications as fall within the true spirit and scope of the invention.

What is claimed is:

1. A device for cooling a thermal head which is arranged within an image recording apparatus, comprising:

a radiating fin;

ventilation means for producing a stream of air for cooling said radiating fin;

duct means for guiding said stream of air after having cooled said radiating fin outside said image recording apparatus; and said duct means including a duct having an air intake end and an air exhaust end, and an expander elastically connecting said duct intake end and said radiating fin.

2. A device as claimed in claim 1, further including means for biasing said expander toward an expanded position.

3. A device as claimed in claim 1, further including a retainer for retaining together said duot and said radiating fin, and biasing means for biasing said expander toward an expanded position where both said radiating fin and said duct are in contact with said retainer.

4. A device for cooling a thermal head which is arranged within an image recording apparatus, comprising:

a radiating fin in thermal contact with a thermal printing head;

blower means for producing a stream of air for cooling said radiating fin;

duct means connected to said radiating fin and extending between said radiating fin and an exhaust opening, said duct means guiding said stream of air after having cooled said radiating fin to a point outside said image recording apparatus; and pivot means for mounting said duct means, said thermal head and said radiating fin such that said duct means, said thermal head and said radiating fin are jointly pivotable toward and away from a platen roller.

5. A device for cooling a thermal head which is arranged within an image recording apparatus, comprising:

a radiating fin;

a cover mounted over a major portion of said radiating fin and serving as an air intake manifold;

ventilation means for producing a stream of air through said intake manifold for cooling said radiation fin; and duct means for guiding said stream of air after having cooled said radiating fin to a position outside said image recording apparatus, said duct means including an expander connected to said air intake manifold and a duct coupled between said expander and an exhaust opening of said image recording apparatus.

6. A device as claimed in claim 5, wherein said expander is connected to said air intake manifold at a central location thereof, such that the stream of air produced by said ventilation means enters said radiating fin at both longitudinal ends thereof and exits from an approximate central location thereof.

* * * * *